United States Patent [19]

Prince

[11] 3,710,816
[45] Jan. 16, 1973

[54] KNIFE GATE VALVE

[76] Inventor: Darryll G. Prince, 1309 Rebecca Lane, Norman, Okla. 73069

[22] Filed: Oct. 12, 1970

[21] Appl. No.: 79,895

[52] U.S. Cl. ............. 137/242, 251/327, 251/328, 251/329
[51] Int. Cl. .......................... F16k 3/02, F16k 25/00
[58] Field of Search......251/327, 328, 329, 214, 326; 137/242

[56] References Cited

UNITED STATES PATENTS

| | | |
|---|---|---|
| 3,164,363 | 1/1965 | Williams..........................251/329 X |
| 3,002,525 | 10/1961 | Grove............................251/328 X |
| 3,442,286 | 5/1969 | Anderson et al. ...............251/327 X |
| 3,164,163 | 1/1965 | Oliver............................251/327 X |
| 3,334,653 | 8/1967 | Works et al....................251/328 X |
| 3,033,517 | 5/1962 | Rovang et al.....................251/214 |
| 3,076,631 | 2/1963 | Grove............................137/242 X |

*Primary Examiner*—Arnold Rosenthal
*Attorney*—Richards, Harris & Hubbard

[57] ABSTRACT

A sliding knife gate valve includes a housing and a sliding gate. The gate has a port therein which moves into and out of registration with inlet and outlet channels in the valve housing. The inlet and outlet channels of the valve housing contain wear rings and o-ring seals which are positioned to wipe the sliding gate clean. In addition, the housing can include additional packing so that the upper portion and lower portion of the gate can extend out of the housing.

16 Claims, 7 Drawing Figures

PATENTED JAN 16 1973

INVENTOR:
DARRYL G. PRINCE

Richards, Harris & Hubbard
ATTORNEYS

PATENTED JAN 16 1973

INVENTOR:
DARRYL G. PRINCE

Richards, Harris & Hubbard
ATTORNEYS

KNIFE GATE VALVE

BACKGROUND OF THE INVENTION

This invention relates to valves and particularly to a sliding knife gate valve particularly adapted for but not limited to use with particulate fluent material conveyed in a pneumatic handling system.

There are a number of gate valves available in the prior art which purport to be satisfactory for handling of fluent material, for example solid particulate polymeric material and the like, which is conveyed with utilization of a pressurized or vacuum pneumatic handling system. Plastic flakes, powders and pellets of polyamides and other polymeric materials are particularly difficult to handle for a number of reasons. A major problem with handling of such particulate material in a pneumatic conveying system is one of friction galling. Of course, pneumatic systems utilize various types of valving. The friction galling in a valve causes it to become inoperable due to an ineffective gas seal and also due to ineffective stoppage of particulate matter flow. Galling of the valve surfaces can also release small pieces of valve construction material, such as metal, from the valve surfaces. These small pieces of metal can result in contamination of the product being conveyed through the pneumatic system. Inoperable valves also result in plant shutdown for repairs unless secondary systems are provided. Provision of the latter or plant shutdowns are undesirable since delays in production increase costs significantly.

A secondary problem with pneumatic conveying of such particulate material arises when particles become lodged within the valve structure itself. Lodging of the particles increases the possibility of galling the valve and valve body surfaces. Lodged particles can also cause sluggish operation of the valve. More significantly, however, when a sufficient number of particles are lodged or trapped between the valve surface and the body of the valve, the valve can become inoperable independent of any galling problems.

Pneumatic or hydraulic actuation of such valves can also be hampered by sluggish operation. In some applications high speed actuation is necessary. Although a valve remains operative, sluggish operation can render the valve ineffective for its intended purpose.

Pneumatic conveying systems are generally used to transfer particulate matter such as described above from one point in a processing operation or transporting operation to another. The foregoing problems of valve wear and of particle lodging cause the additional problem of fluid leakage with such conveying systems. Pneumatic conveying systems can be operated under pressure, for example, up to about 15 p.s.i.g. or can be operated under vacuum conditions. The fluid driving force in a pressurized system can leak from a valve or atmospheric gas can leak into a vacuum conveying system if sufficient precautions are not taken. Of course, in order to operate valves in a conventional manner, there must be communication between an interior valve surface and the exterior of the valve housing in order to provide mechanical connection between the valve surface and the valve operating means. If ineffective seals are provided, fluid can either leak in or leak out, depending of course on whether the conveyor system is vacuum or pressurized. Such fluid leakage is undesirable in either case. Galling of valve surfaces and of body surfaces or seats causes wear and eventually causes leakage of motive fluids. Likewise, if particles become trapped between the valve and valve seat surfaces, fluid leakage can again occur in these areas without galling or wear.

It is, therefore, desirable to possess a valve, particularly a gate valve, which will solve the foregoing problems. That is, the problems of galling, particle lodging and motive fluid leakage into or out of the conveying system in conjunction with which the valve is being utilized.

SUMMARY OF THE INVENTION

This invention, therefore, provides a valve comprising a housing having an inlet channel and an outlet channel, a gate having two faces and a port therein opening into the faces, said gate reciprocable between an open position and a closed position, said port communicating with said channels when the gate is in the open position, wear means associated with at least one of the channels for wiping the face of the gate as it is reciprocated, and means associated with said housing to couple said channels to a conduit.

BRIEF DESCRIPTION OF THE DRAWINGS

A more complete understanding of the invention may be had by referring to the following detailed description when taken in conjunction with the drawings, wherein.

DESCRIPTION OF PREFERRED EMBODIMENTS

The present invention will be described in terms of a preferred embodiment specifically designed to handle particulate fluent material in a pneumatic conveying system. It is, however, to be understood that many alterations and variations can be made without departing from the inventive concept of the present invention. It is to be limited only by the definition contained in the appended claims.

Figure 1:
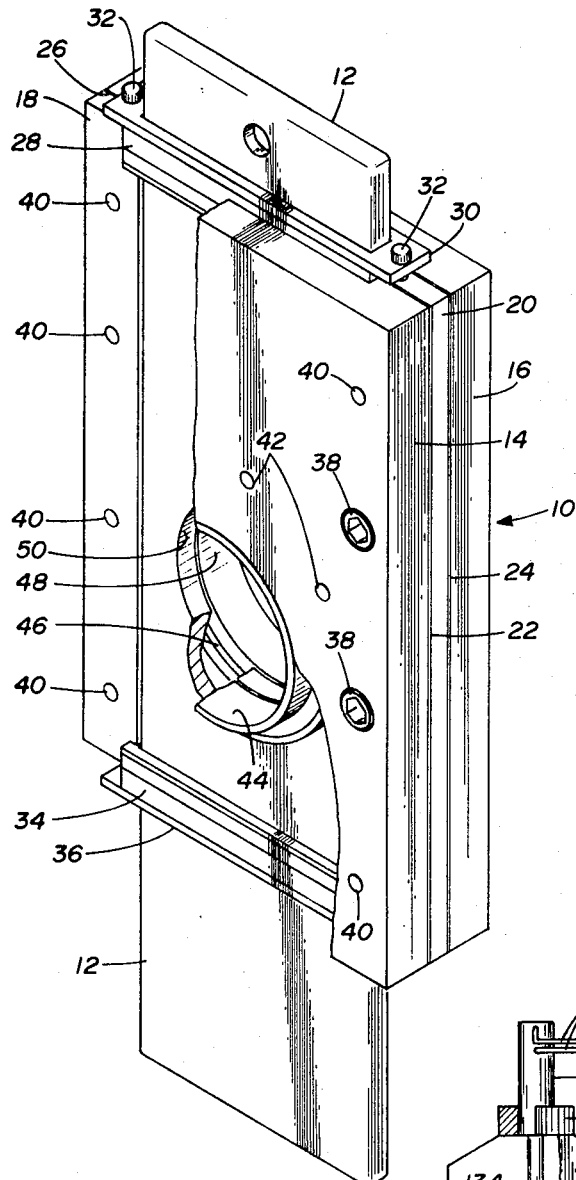
FIG. 1 is an isometric view, partially broken away, illustrating the valve of the present invention.

Referring now to FIG. 1, an isometric view of a preferred embodiment of the valve of the present invention is shown. Like numerals will be used on subsequent figures to indicate the same or similar components. The housing or valve body 10 and other portions of the valve structure have been partially broken away for clarity in illustrating the assembly and operation of the valve. A gate 12 is reciprocably and slidably mounted in the valve body 10. The valve body 10 and the channel in which the gate 12 is mounted is formed from two body plates 14 and 16. The body plates are spaced apart to form the channel in which the gate 12 is slidably mounted by shim 18 and shim 20. Gaskets 22 and 24 are interposed between the shim 20 and the respective body plates 14 and 16 to provide a fluid tight seal along the longitudinal edges of the body 10. Similar gaskets are employed between the body plates 14 and 16 and the shim 18. One gasket 26 is so indicated.

A fluid tight seal, generally designated 28, is provided at the upper end of the body 10 contacting both the valve body 10 and the sliding gate 12. The seal 28 is retained in a slot provided therefor by retainer bracket 30 which in turn is held in position by bolts 32 threaded into shims 18 and 20. A similar seal generally designated 34 is provided at the bottom end of the valve body 10 providing a fluid tight seal between the interior and exterior of the valve body 10, yet allowing the gate 12 to reciprocate therethrough. A similar retainer bracket 36 is provided and maintained in position by bolts (not shown) threaded into the bottom of the shims 18 and 20. A more detailed explanation of the construction of the fluid tight seals 28 and 34 is provided in conjunction with FIG. 6.

The body plates 14 and 16 and the shims 18 and 20 as well as the gaskets interposed therebetween are combined into an integral structure by threaded bolts 38 which are inserted through a plurality of holes 40 provided in the body plates, shims and gaskets. As shown, eight bolts are utilized, four on each side of the body 10, to form an integral structure from the shims and body plates. A plurality of threaded holes 42 are also provided for connecting the valve body 10 to a pneumatic or particulate carrying conduit. Similar holes are provided around the outlet channel on the rear face of body plate 16.

A wear ring 44 is recessed in the inlet channel of body plate 14. An identical wear ring is recessed in the outlet channel formed in body plate 16. The interior surface of the wear ring 48 is provided with a groove in which a resilient seat member 46 is retained, a similar seat being provided in ring 44. The seat 46 provides a completely fluid tight interface between the valve body and the sliding gate 12. The wear rings 44 and 48 are separated from the opposite faces of gate 12 by a significantly small tolerance, usually less than about 0.005 to 0.010 inch. The construction of the wear ring will be elaborated upon in conjunction with FIG. 4.

In operation, the valve as shown in FIG. 1 is in the open position. To close the valve, the gate 12 is reciprocated upwardly until the port 50, shown in communication with the inlet channel in body member 14 and the outlet channel in the body member 16, is sufficiently moved upwardly so that it is no longer in communication with the inlet and outlet channels. Thus the communication between the inlet and outlet channels is completely blocked by the lower portion of the gate 12 which is then positioned the two channels. The fluid tight seals provided in the wear rings 44 and 48 prevent fluid or particulate matter from escaping through the valve.

Figure 2:
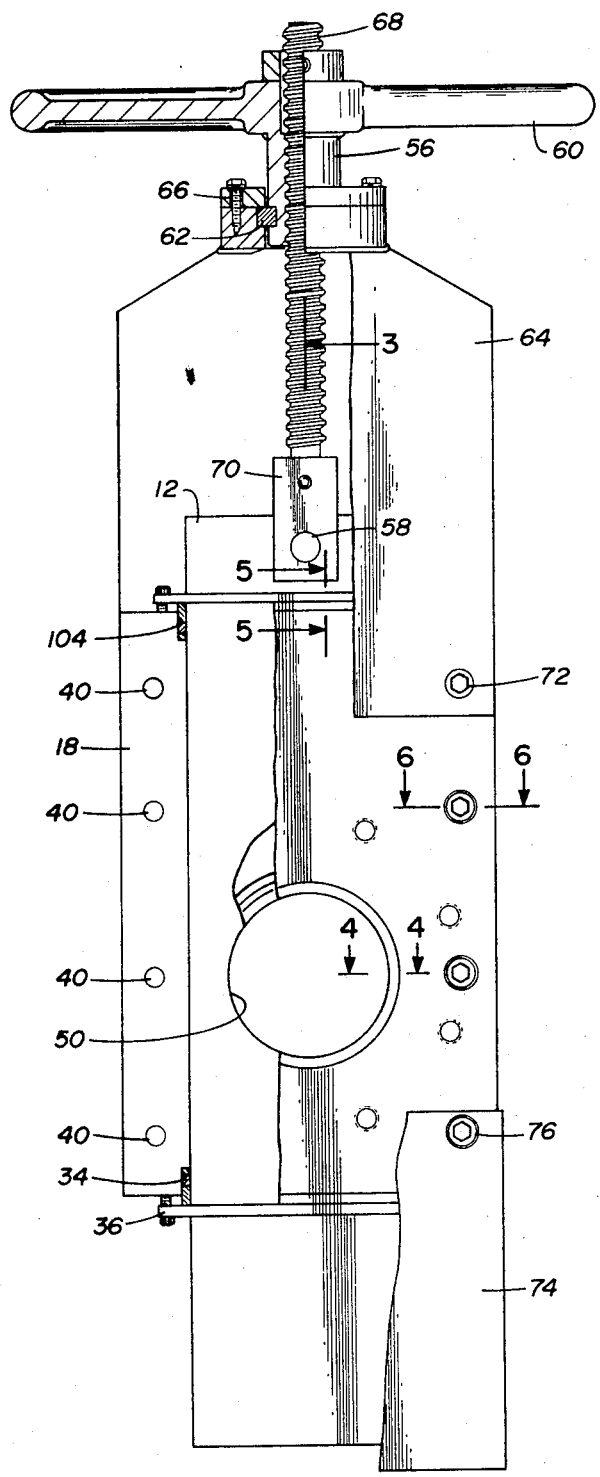
FIG. 2 is a front elevational view, partially broken away, illustrating the valve of the present invention.
Figure 3:
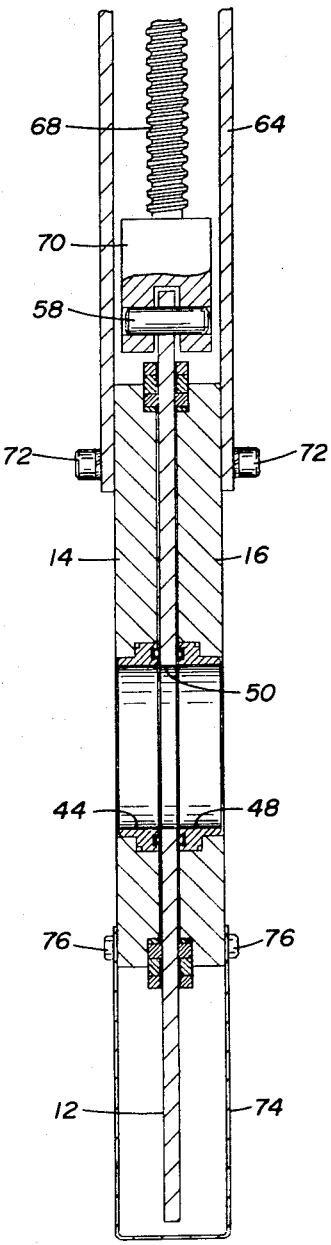
FIG. 3 is a cross-sectional view of the valve of FIG. 2 taken along section line 3—3.

Referring now to FIGS. 2 and 3, they are respectively a front elevational view partially broken away and a side elevation cross-sectional view along a section line similar to 3—3 of FIG. 2. The reciprocating gate 12 is moved up and down in the present embodiment by actuation of the hand wheel 60. The hand wheel 60 rotates in the bushing 62 which is in turn connected to an upper shroud member 64 by a suitable mechanical connection 66. The interior of the hub 56 of the hand wheel 60 is threaded and engages the threaded member 68. The threaded member 68 is connected to coupling 70 which in turn is connected to the gate member 12 by pin 58. As the hand wheel is rotated in a counterclockwise direction, the threaded member 68 will rise through the hub 66. As it rises, it will force gate member 12 upwardly to deregister the port 50 from the inlet and outlet channels in which wear rings 44 and 48 are recessed. The shroud member 64 is held in position by bolts 72 which are threadably engaged through the uppermost of holes 40 in the body members 14 and 16 into the shims or spacers between the body members. Likewise, a lower shroud 74 is provided which surrounds the lower portion or end of the gate member 12. Shroud 74 is also held in position by bolts 76 which are threadably engaged in the body member and shims through the lower most of threaded holes 40.

As can be readily seen, the body members 14 and 16 can be so constructed that they extend beyond the bottom of the gate portion 12 thus completely enclosing the reciprocating lower ends of the gate member 12. This type of construction would eliminate the need for the shroud 74 and the lower packing member 34 held in position by bracket 36. In this alternate type of construction, an additional shim would be provided between the lower horizontal portions of the extended body member. This construction, although acceptable for some purposes, is not preferred since it does not facilitate maintenance of the valve or removal of the gate member. Such construction would also provide a cavity to collect particulate matter. It should also be understood at this point that although the embodiment shown includes a hand actuated gate, the actuating mechanism or means could as well be a pneumatic or hydraulic actuated cylinder remotely or otherwise controlled.

Figure 4:
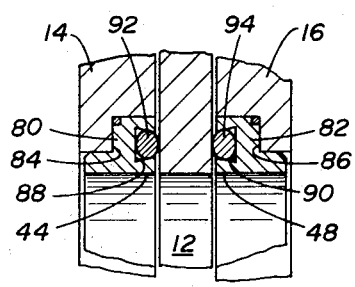
FIG. 4 is a cross-sectional view of the valve of FIG. 2 taken along section line 4—3.

Referring now to FIG. 4, an enlarged view of the wear rings 44 and 48 is shown. The enlarged view is taken along a section line similar to 4—4 in FIG. 2. The wear rings manufactured from, for example, a hard chrome plated steel or an 18-8 stainless steel, are positioned in recesses or openings provided in body members 14 and 16. The wear rings are provided with shoulder portions 80 and 82 which mate with annular notches 84 and 86 in the interior walls of the body plates 14 and 16. The cooperation of the shoulders 80 and 82 with the notches 84 and 86 retain the wear rings 44 and 48 in position in the body plates. The clearance between the interior face of the wear rings and the faces of the gate 12 is preferably about 0.005 inch although it can range up to about 0.010 inch. This small gap between the interior faces of the wear rings and the faces of the gate prevent particulate matter from entering the space between the body of the valve and the gate 12. The interior faces of the wear rings 44 and 48 wipe the face of the gate 12 to prevent particle lodging. As the gate is made from a hard chrome plated steel, for example a 4–10 stainless steel, and the wear rings are manufactured from a similar steel, for example an 18–8 stainless steel, friction galling of the moving parts is also prevented. The interior face of the wear rings 44 and 48 are provided with annular dove-tail notches 88 and 90. A resilient ring-like seat 92 is positioned in the dove-tail notch 88. A similar seat 94 is positioned in the dove-tail notch 90. These seats are made from a resilient, preferably synthetic polymeric material, for example, a polytetrafluoroethylene resin. The seats 92 and 94 provide a fluid tight seal for the valve. The fluid tight seal is operative both when the valve is in its open position and when the gate is moved upwardly to close the valve. Preferably the gate 12 intimately contacts only the seats 92 and 94 sandwiching it therebetween. Preferably the gate is separated from the wear rings by the tolerances set forth above to prevent actual metal to metal contact. The wear rings also prevent particulate matter build-up on the seats 92 and 94 as they wipe the gate faces.

Figures 5, 7:
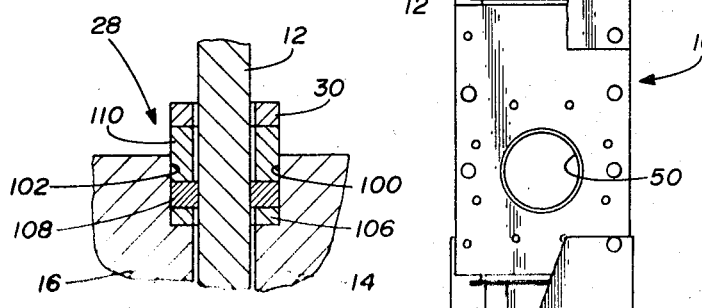
FIG. 5 is a cross-sectional view of the valve taken along section line 5—5 of FIG. 2.

Referring to FIG. 5, the fluid tight seal 28 is illustrated. Since the lower seal 34 is similar in construction, but merely inverted, no explanation of it will be given. The description of the construction and operation of the upper seal 28 will be sufficient to describe the characteristics of the lower packing 34. Each of the body plates 14 and 16 is provided with a notch 100 and 102, respectively. In addition, the shims are provided with a similar notch along the interior edge thereof. For example, shim 18 is provided with notch 104, (see FIG. 2). The seal 28 is provided with a gland bottom 106 made from, for example, a carbon steel. Each of the components of the seal is of generally a rectangular shape with a rectangular aperture therein slightly larger than the exterior dimensions of the gate 12. Positioned above the gland bottom 106 is the packing 108. The packing can be a conventional packing material, but is preferably a resilient fiberous, combination of a polytetrafluoroethylene resin and asbestos. Other suitable, relatively low friction, compressible materials can also be used. A follower 110 is positioned above the packing 108. The gland bottom 106, packing 108 and follower 110 are retained by a retainer bracket 30 positioned above the follower 110.

As is better seen in FIG. 1, the retainer bracket 30 extends longitudinally beyond the edges of the follower 110. The retainer bracket 30 is provided with holes which are aligned with threaded holes in the shims 18 and 20. Threaded bolts 32 are positioned in the holes provided in the retainer bracket 30 and threadably engage the holes in the upper portion of the shims 18 and 20. These bolts, when tightened, will transmit a force through the retainer bracket and follower upon the packing causing the packing to expand against the periphery of the gate 12 to provide an effective fluid seal. The bolts 32, of course, are adjustable to provide varying degrees of packing pressure on the gate 12. Usually the bolts 32 are adjusted to provide for a medium pressure, thus assuring maximum life of the packing 108.

In actual practice, the packing 108 and a corresponding packing in the lower packing member 34 suspend the gate 12 in the body 10 of the valve. The packings serve the additional purposes of preventing fluid leakage into or out of a pneumatic conveying system. Additionally, the preferred packing has low friction properties because of the polytetrafluoroethylene content, thus providing low friction bearings to support the gate as it reciprocates in its operating cycle. Of course, as previously explained the center section of the gate is suspended or contacted by the seats 92 and 94 provided in the wear rings 44 and 48.

Figure 6:
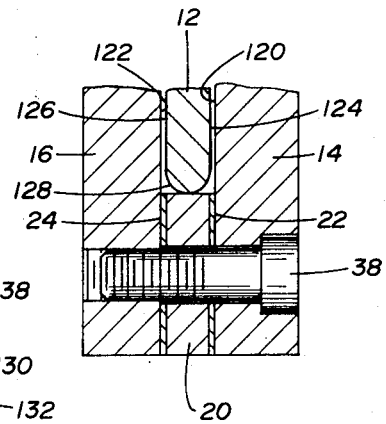
FIG. 6 is a cross-sectional view of the valve taken along section line 6—6 of FIG. 2; and, FIG. 7 is a broken elevation view of a fluid operated valve.

Referring briefly to FIG. 6, the construction of the body plates and shim is shown. FIG. 6 is a cross-sectional view taken along section line 6—6 of FIG. 2. Body plate 14 is separated from body plate 16 by shim 20. A fluid tight seal is provided along the edges of the body 10 by the gaskets 22 and 24. A bolt 38 having its head recessed in an appropriate recess in body plate 14 engages threads provided in an aligned hole in body plate 16. Thus, the body plates 14 and 16 are integrally bound. It is generally preferred that the heads of the center bolts 38 be recessed in the body plate 14 to provide sufficient face area on the exterior of the valve body for connection of conduits or other piping to the valve body via the threaded holes 42.

To provide optimum characteristics in the valve construction of the present invention, it is desirable to maintain close tolerances between inner surfaces 120 and 122 of the body plates 14 and 16 and the ground and polished faces 124 and 126 of the gate 12. The internal surfaces 120 and 122 of the body plates preferably are dimensional parallel with the ground faces 124 and 126, respectively, of the gate 12. The internal surfaces 120 and 122 should be smoothed to prevent particle shear and deposit. They should be hard to prevent wear, leading to loss of dimensional control, which in turn leads to particle lodging and wedging. When particles lodge and wedge, they in turn cause sluggish operation of the valve and galling of the valve surfaces. A general construction technique usable to provide these characteristics is to first grind the interior surfaces 120 and 122 of the body plates and the faces 124 and 126 of the gate 12. Once these surfaces are ground and polished, a coating of hard chrome plating is deposited thereon. This plating provides a localized surface hardness to resist wear and galling. It further assists friction reduction by virtue of a still smoother surface provided by the chrome plating.

The shims can be manufactured from a carbon steel or a hard chrome plated steel. (Shim 20 only is shown in FIG. 6.) It is preferred, however, that the shims be manufactured from bronze or similar material or a synthetic polymeric resin, such as polytetrafluoroethylene, a polyamide or an acetal resin. These latter materials provide low friction guide surfaces for the radiused longitudinal edges of the gate 12, for example edge 128 of shim 20. The shims aid in keeping the gate aligned with the inlet and outlet channels in the body. Manufacture of the shims from the preferred materials also prevents galling on the radiused edges of the gate. Thus, it is seen that all bearing surfaces of the gate 12 ride on low friction material, the packings 28 and 34, the seats 92 and 94, and the shims 18 and 20, to provide easy, low friction operation.

The gate 12 preferably has a full radius edge 128 thereon to reduce contact between the gate 12 and the shims to a theoretical line, thus further reducing friction and sluggish operation. Furthermore, the rounded surface or radiused longitudinal edges, for example edge 128, of the gate 12 provide a rounded surface for the packing material, for example packing 108 (FIG. 5)

to wrap around. This feature eliminates the wrinkles in the packing which could contribute to a possible leakage source.

FIG. 7 illustrates, partially schematically, a fluid operated valve of the present invention. One of the primary uses of the valve of the present invention requires high speed operation of the gate 12. Quick actuation cannot be derived from a screw-type actuating means as illustrated in the previous figures. To allow rapid operation, a fluid operated actuator is utilized. The fluid operated actuator can be, for example, a pneumatic or hydraulic cylinder. A fluid cylinder 130 is attached by means of a bracket 132 to the upper shroud 64 of the valve. A piston 134 slidably disposed in the cylinder 130 is connected through yoke 136 to the gate 12. The fluid cylinder 130 is connected through conduits 138 to a suitable source (not shown) of actuating fluid, for example, air or hydraulic fluid. The remainder of the valve is identical to that described above.

Rapid operation, that is closing and opening of the port 50 by quickly lowering and raising the gate 12, can be achieved through the use of such a fluid actuator. It should be recognized, however, that the particular attributes of the valve structure as described above facilitate rapid operation of the valve without use of grossly oversized fluid actuation systems. For example, the relatively friction-free packing surfaces and ring-like seats recessed in the wear rings provide low friction bearing surfaces for the gate. In addition, the low friction shims separating the body plates provide increased ease of operability. These advantages of the present valve when combined with fluid actuation produce a valve particularly suited to high speed operation.

The foregoing description has been provided with respect to a preferred embodiment of the valve. This embodiment of the valve is especially designed for handling of particulate materials such as synthetic polymeric powdered materials or pellets thereof. The valve, however, has other uses to which it is particularly adaptable. For example, the valve readily lends itself to utilization with pulp slurries encountered in the paper industry. The present valve can also be utilized to handle abrasive particulate materials such as sand and fly ash. Therefore, the present invention is to be limited only by the definition contained in the appended claims.

What is claimed is:

1. A valve comprising:
   a housing having at least an inlet channel and at least an outlet channel,
   a gate having two faces and a port therein opening onto the faces, said gate reciprocable between an open position and a closed position, said port communicating with said channels when said gate is in said open position,
   a wear ring member having a shoulder thereon recessed in a mating groove in said housing, said mating groove surrounding and contiguous with at least one of said channels, said ring extending from the interior of said housing to the exterior of said housing, the interior edge of said ring lying in a plane parallel to the face of said gate for wiping the faces of said gate as it is reciprocated,
   a sealing member positioned in an annular notch provided in said shoulder portion of said ring, said sealing member intimately contacting said notch and said mating groove in said housing, and
   means associated with said housing to couple said channels to a conduit.

2. The valve of claim 1 further comprising:
   packing means in said housing and surrounding the upper portion of said gate, the upper portion of said gate reciprocable in said packing means and extending from the interior of said housing to the exterior thereof through said packing means,
   means attached to the upper end of said gate for reciprocating said gate between said open and closed positions.

3. The valve of claim 2 further comprising:
   packing means in said housing and surrounding the lower portion of said gate, the lower portion of said gate reciprocable in said packing means and extending from the interior of said housing to the exterior thereof through said packing means.

4. The valve of claim 3 further comprising:
   a shroud attached to the lower end of said housing and surrounding the lower end of said gate.

5. The valve of claim 4 further comprising:
   a shroud attached to the upper portion of said housing and surrounding the upper portion of said gate.

6. The valve of claim 5 wherein said housing comprises:
   two elongated plate members, each of said plate members having a channel and mating groove therein,
   spacing members separating said plates along the longitudinal edges thereof forming a chamber in which said gate is reciprocable,
   means for holding said plates in said aligned position.

7. The valve of claim 6 wherein each of said channels has a wear ring associated therewith.

8. The valve of claim 3 comprising a wear ring and seat member positioned in each of said inlet and outlet channels.

9. The valve of claim 8 wherein said packing is composed of a relatively friction-free polymeric material.

10. The valve of claim 8 wherein said seat members comprise a relatively friction-free polymeric material.

11. The valve of claim 6 wherein said spacing members provide bearing surfaces for said gate member, said spacing members comprising a relatively friction-free material.

12. The valve of claim 11 wherein said spacing members are composed of a material selected from a polyamide, a polytetrafluoroethylene resin, an acetal resin and bronze.

13. The valve of claim 9 wherein said packing comprises a combination of asbestos and polytetrafluoroethylene resin.

14. The valve of claim 10 wherein said seat members are composed of a polytetrafluoroethylene resin.

15. The valve of claim 11 wherein said packing means supports said gate member, the faces of said gate being held in spaced relationship from said elongated plate members by said packing means.

16. The valve of claim 15 wherein each of said packing means comprises a relatively friction-free packing material, a follower contacting said material, a retainer means adjustably mounted to said housing for varying the pressure said follower exerts on said material.

* * * * *